United States Patent
Hu et al.

(10) Patent No.: US 11,184,319 B2
(45) Date of Patent: Nov. 23, 2021

(54) METHOD, DEVICE, APPARATUS FOR MAC ADDRESS CONFLICT DETECTION AND COMPUTER READABLE STORAGE MEDIUM

(71) Applicant: Nokia Solutions and Networks Oy, Espoo (FI)

(72) Inventors: Zhiyuan Hu, Shanghai (CN); Duan Chen, Shanghai (CN); Yueming Yin, Shanghai (CN); Zhigang Luo, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/892,437

(22) Filed: Jun. 4, 2020

(65) Prior Publication Data

US 2020/0403967 A1    Dec. 24, 2020

(30) Foreign Application Priority Data

Jun. 20, 2019   (CN) .......................... 201910539190.7

(51) Int. Cl.
*H04L 29/12* (2006.01)
*H04W 76/10* (2018.01)
*H04W 84/12* (2009.01)

(52) U.S. Cl.
CPC ...... *H04L 61/2046* (2013.01); *H04L 61/6022* (2013.01); *H04W 76/10* (2018.02); *H04W 84/12* (2013.01)

(58) Field of Classification Search
None
See application file for complete search history.

(56) References Cited

U.S. PATENT DOCUMENTS

| 2003/0177267 | A1 | 9/2003 | Orava et al. ................... 709/245 |
| 2007/0288994 | A1* | 12/2007 | Tang ................... H04L 61/6022 726/2 |
| 2018/0077742 | A1* | 3/2018 | Pang ................... H04L 61/6022 |

OTHER PUBLICATIONS

B. Volz et al.; "Link-Layer Addresses Assignment Mechanism for DHCPv6"; Internet Engineering Task Force, Dynamic Host Configuration (DHC) Internet-Draft; Oct. 20, 2018; pp. 1-18.
Anonymous; "Fast Duplicate Address Detection During Registration with a Wireless LAN"; Research Disclosure, vo. 41, No. 41270; Aug. 1998; pp. 1-2.

* cited by examiner

*Primary Examiner* — Kenny S Lin
(74) *Attorney, Agent, or Firm* — Harrington & Smith

(57) ABSTRACT

A method, a device, an apparatus and a computer-readable storage medium for MAC address conflict detection. The method includes: in response to detecting a wireless local area network, transmitting, at a first device, a dummy MAC address of the first device to a second device in the wireless local area network, the dummy MAC address being different from a real MAC address of the first device; transmitting an address conflict detection request for the dummy MAC address to the second device; and in response to an address conflict detection response from the second device indicating that there is no conflict for the dummy MAC address, establishing a connection with the wireless local area network. The method may effectively protect privacy information for a user of a terminal device, while avoiding a MAC address conflict, such that the user can communicate in a secure network environment.

23 Claims, 6 Drawing Sheets

METHOD, DEVICE, APPARATUS FOR MAC ADDRESS CONFLICT DETECTION AND COMPUTER READABLE STORAGE MEDIUM

FIELD

Embodiments of the present disclosure generally relate to the field of wireless communication, and more specifically, to a method, a device, an apparatus for MAC address conflict detection and computer-readable storage medium.

BACKGROUND

With the rapid development of wireless communication, a terminal device, such as a smart phone, has the capability to access a wireless network anytime and anywhere. When the terminal device accesses a cellular network (e.g., Global System for Mobile Communications (GSM), UMTS (Universal Mobile Telecommunications System), LTE/SAE (Evolved Package System), etc.), the cellular network can obtain International Mobile Subscriber Identity (IMSI) of a user or the International Mobile Equipment Identity (IMEI) of the user's terminal device. When the terminal device accesses a wireless local area network (WLAN) based on the IEEE 802.11 standard, the terminal device may actively or passively transmit a media access control layer (MAC) address of the terminal device to the access device of WLAN.

Since the IMSI, IMEI or MAC address can uniquely identify the user or the user's terminal device, the user of the terminal device may be tracked by tracking the IMSI, IMEI or MAC address. This may result in security risks and information leakage risks to users, and is harmful to the privacy protection for users. Currently, 3GPP technical specifications TS33.102, TS33.401 and 3GPP TS33.501 have proposed solutions for preventing user information from being tracked by IMSI or IMEI. However, the tracking of the user equipment based on the MAC address has not been effectively suppressed.

SUMMARY

In general, the embodiments of the present disclosure provide a method, a device, and an apparatus for MAC address conflict detection and a computer-readable storage medium.

In a first aspect, an embodiment of the present disclosure provides a first device. The first device includes at least one processor, and at least one memory including computer program codes. The at least one memory and the computer program codes are configured to, with the at least one processor, cause the first device to: in response to detecting a wireless local area network, transmit a dummy MAC address of the first device to a second device in the wireless local area network, the dummy MAC address being different from a real MAC address of the first device; transmit an address conflict detection request for the dummy MAC address to the second device; and in response to an address conflict detection response from the second device indicating that there is no conflict for the dummy MAC address, establish a connection with the wireless local area network.

In a second aspect, an embodiment of the present disclosure provides a second device. The second device includes at least one processor, and at least one memory including computer program codes. The at least one memory and the computer program codes are configured to, with the at least one processor, cause the second device to: receive a dummy MAC address from a first device, the dummy MAC address being different from a real MAC address of the first device; receive an address conflict detection request for the dummy MAC address from the first device; and transmit an address conflict detection response to the first device to indicate whether there is a conflict for the dummy MAC address.

In a third aspect, an embodiment of the present disclosure provides a method of detecting a media access control layer, MAC, address conflict. The method includes: in response to detecting a wireless local area network, transmitting, at a first device, a dummy MAC address of the first device to a second device in the wireless local area network, the dummy MAC address being different from a real MAC address of the first device; transmitting an address conflict detection request for the dummy MAC address to the second device; and in response to an address conflict detection response from the second device indicating that there is no conflict for the dummy MAC address, establish a connection with the wireless local area network.

In a fourth aspect, an embodiment of the present disclosure provides a method of detecting a media access control layer, MAC, address conflict. The method includes: receiving, at a second device, a dummy MAC address from a first device, the dummy MAC address being different from a real MAC address of the first device; receiving an address conflict detection request for the dummy MAC address from the first device; and transmitting an address conflict detection response to the first device to indicate whether there is a conflict for the dummy MAC address.

In a fifth aspect, an embodiment of the present disclosure provides an apparatus for detecting a media access control layer, MAC, address conflict. The apparatus includes means for performing the method according to the third aspect.

In a sixth aspect, an embodiment of the present disclosure provides an apparatus for detecting a media access control layer, MAC, address conflict. The apparatus includes means for performing the method according to the fourth aspect.

In a seventh aspect, an embodiment of the present disclosure provides a computer-readable storage medium having a computer program stored thereon, the computer program including instructions which, when executed by a processor on a device, cause the device to execute the method according to the third aspect.

In an eighth aspect, an embodiment of the present disclosure provides a computer-readable storage medium having a computer program stored thereon, the computer program including instructions which, when executed by a processor on a device, cause the device to perform the method according to the fourth aspect.

It should be understood that what is described in the summary is neither intended to limit the key or essential features of exemplary embodiments of the present disclosure, nor to limit the scope of the present disclosure. Other features of the present disclosure will become apparent through the following description.

BRIEF DESCRIPTION OF THE DRAWINGS

The foregoing and other features, benefits, and aspects of various embodiments of the present disclosure will become more apparent from the following detailed description with reference to the accompanying drawings, in which the same or similar reference signs are used to designate the same or similar elements, where.

Throughout the drawings, the same or similar reference signs represent the same or similar elements.

DETAILED DESCRIPTION OF EMBODIMENTS

Figure 1:
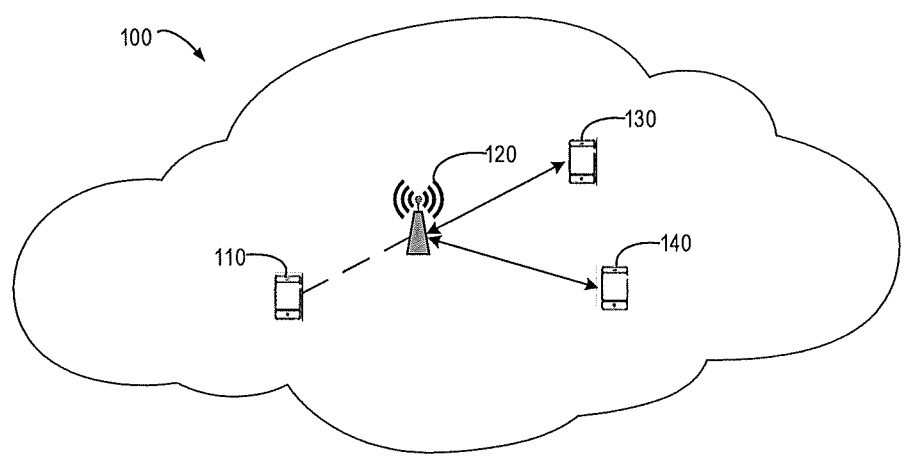
FIG. 1 shows an example wireless local area network in which the embodiments of the present disclosure may be implemented.

Some exemplary embodiments of the present disclosure will now be described below with reference to the accompanying drawings. Although the drawings illustrate exemplary embodiments of the present disclosure, it is to be understood that the present disclosure can be implemented in various manners, and should not be construed as being limited to the embodiments set forth herein. Instead, these embodiments are given for a thorough and full understanding of the present disclosure. It should be understood that drawings and embodiments of the present disclosure are only for the purpose of illustration, and are not intended to limit the protection scope of the present disclosure.

As used herein, the terms "wireless local area network" and "WLAN" refer to a radio frequency network based on the IEEE 802.11 standard, which may be either a temporary network established by two devices, or a network coverage within a certain range provided by an access device, such as a base station or an access point (AP). For the purpose of discussion, some embodiments of the present disclosure have been described by an example of a wireless local area network using the wireless fidelity (Wi-Fi) technology and including the Wi-Fi AP. It should be understood that the embodiments of the present disclosure are also applicable to network deployments using other wireless communication technologies such as Bluetooth. The scope of the present disclosure is not limited in this regard.

As used herein, the term "first device" refers to an electronic device capable of wireless communication and can access the Internet, such as a terminal device. The first device may include, but is not limited to, a mobile phone, a smart phone, a laptop computer, a tablet computer, a personal digital assistant (PDA), a wearable smart device, and the like.

As used herein, the term "second device" refers to an access device that can establish a wireless local area network to provide a network coverage within a certain range, and can coordinate communications in the wireless local area network. The second device may include, but is not limited to, a base station, a standalone Wi-Fi AP (also referred to as a fat AP) or a Wi-Fi AP along with an access controller (also referred to as a thin AP), a wireless switch, and a wireless router and the like.

As used herein, the terms "comprise", "include" and variants thereof are intended to be inclusive, i.e. "including but not limited to". Unless otherwise clearly stated, the term "or" is intended to include "and/or". The term "based on" is intended to include "based at least in part on". The terms "exemplary embodiment" and "some embodiments" are intended to include "at least one exemplary embodiment". The following description may also include other explicit and implicit definitions.

As used herein, the term "circuitry" refers to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all use cases of this term in this application including in any claims. As a further example, as used in this application, the term "circuitry" also covers an implementation of merely a hardware circuit or a processor (or multiple processors), or a portion of a hardware circuit or a processor, and its (or their) accompanying software and/or firmware. The term "circuit" also covers, for example, and if applicable to a particular claim element, a baseband integrated circuit or a processor integrated circuit, or OLT, DPU or similar integrated circuits in other computing devices.

The MAC address is an address allocated by a device manufacturer during the manufacturing of a terminal device for uniquely identifying a location of the terminal device in a network. When the terminal device enters the coverage of the wireless local area network and the WLAN connection function of the terminal device is turned on, the terminal device may actively or passively transmit its MAC address to an access device in the WLAN. As mentioned earlier, since the MAC address is globally unique, the user of the terminal device can be tracked by the MAC address. For example, when the user uses a free wireless Internet service in public places (e.g., airports, libraries, stadiums, etc.), an SMS may be used for verification. In this way, the MAC address may be bound to the mobile phone number. Once the MAC address is leaked, for example, from the WLAN access device that stores the MAC addresses, and in turn the user's personal information can be obtained through the binding between the MAC address and mobile phone number (e.g., the user name, phone number, gender, family address, etc.), thereby resulting in a risk of leakage of the user's private information.

Therefore, one objective of the embodiments of the present disclosure is to replace the real MAC address of the terminal device with a dummy MAC address during the terminal device accessing the WLAN and establishing a connection with the WLAN, thereby protecting the real MAC address from leakage. From the perspective of the access device (for example, an access node based on the IEEE 802.11 protocol), the MAC addresses received from any terminal devices that request access to the WLAN are globally unique by default, and thus the MAC addresses are unlikely to conflict with MAC addresses of other terminal devices that have accessed the WLAN. However, from the perspective of the terminal device, the dummy MAC address may conflict with the MAC addresses of the other terminal devices. Once the address conflict occurs, both the terminal device, which uses the dummy MAC address to access the WLAN, and another terminal device, which has a conflict with the dummy MAC address, cannot connect to the WLAN normally. Therefore, there is a need to provide a solution for ensuring that the dummy MAC address does not conflict with the MAC addresses of other devices that have accessed the WLAN and maintained a communication connection with the WLAN.

Reference is now made to FIG. 1, which shows an example wireless local area network (WLAN) 100 in which the embodiments of the present disclosure may be implemented. As shown in FIG. 1, the WLAN 100 may include first devices 110, 130, and 140 and a second device 120, which may communicate with each other. In this example, the first device 110 is shown as a terminal device, and the second device 120 is shown as the access device in the WLAN 100.

The second device 120 may be configured to establish the WLAN 100 to provide wireless network coverage within a certain spatial range. Various electronic devices that are successfully connected to the WLAN 100 may communicate wirelessly within the coverage.

The first devices 110, 130, and 140 are all located within the coverage of the WLAN 100, where the first devices 130 and 140 have successfully connected to the WLAN 100, and the first device 110 has not established a connection with the WLAN 100.

It should be understood that the environment of WLAN as shown in FIG. 1 is only for illustrative purposes and does not imply any limitation to the scope of the present disclosure. The embodiments of the present disclosure may also be embodied in different network environments. Although only a limited number of elements or entities are shown in FIG. 1, the number is given for the purpose of illustration without suggesting any limitations. In practice, there may be more or fewer first devices or second devices as needed. In addition, it should also be understood that the WLAN 100 may also include other elements or entities for implementing the network coverage, which are not shown for simplicity, but this does not mean that the embodiments of the present disclosure do not contain such elements or entities. The scope of the present disclosure is not limited in this regard.

Figure 2:
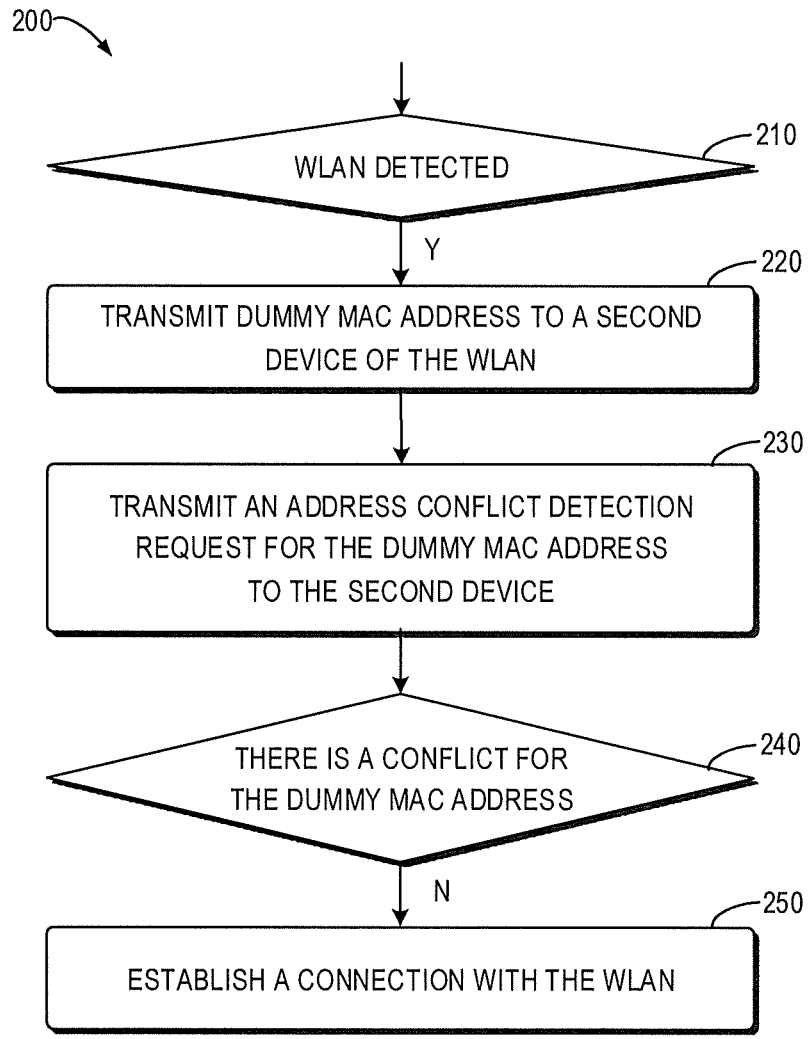
FIG. 2 shows a flowchart of a method for MAC address conflict detection according to some exemplary embodiments of the present disclosure.

FIG. 2 shows a flowchart of a method for MAC address conflict detection according to some exemplary embodiments of the present disclosure. The method 200 may be implemented at the first device 110 (e.g., the terminal device) as shown in FIG. 1, or may be implemented by using any other suitable device. For ease of discussion, the method 200 will be described below with reference to FIG. 1.

As described above, before the first device 110 connects to the WLAN 100, the first device 110 has to transmit its MAC address to the second device 120. In order to protect the user's privacy information and prevent the first device from being tracked, the first device 110 may use the dummy MAC during a process of accessing the WLAN 100 and subsequently establishing a connection with the WLAN 100, so that its real MAC address is not exposed.

As shown in FIG. 1, the first device 110 is within the coverage of the WLAN 100, but has not established a connection with the WLAN 100. In this case, the first device 110 may detect a wireless network deployed nearby, i.e., the WLAN 100, as shown by block 210.

If the first device 110 detects the WLAN 100, the method proceeds to block 220. At block 220, the first device transmits the dummy MAC address to the second device 120 of the WLAN 100. In an exemplary embodiment, the dummy MAC address is different from the real MAC address of the first device 110.

In some exemplary embodiments, the first device 110 may be configured to generate a dummy MAC address (e.g., 00:01:6C:0F:B6:31) different from its real MAC address. The first device 110 may then transmit the dummy MAC address, i.e., 00:01:6C:0F:B6:31, to the second device 120. As an example, the dummy MAC address may be randomly generated by the first device 110 by using a function generating a dummy MAC address (for example, Phantom_MAC_address_enabler). Alternatively, the dummy MAC address may be selected by the first device 110 from a set of pre-configured MAC addresses, for example, by reusing the set of pre-configured MAC addresses or other means. The scope of the present disclosure is not limited in this regard.

From the perspective of the second device, MAC addresses received from any of the first devices that requests access to the WLAN are globally unique MAC addresses by default, and the MAC addresses are supposed to be unlikely to conflict with a MAC address of another first device that is currently connected to the WLAN. However, according to embodiments of the present disclosure, from the perspective of the first device, since the dummy MAC address is generated by the first device to replace the real MAC address, it may be possible that the dummy MAC address conflicts with a MAC address of another first device. Therefore, before the first device 110 accesses the WLAN 100 and establishes a connection with the WLAN 100, it is necessary to perform a MAC address conflict detection for the dummy MAC address 00:01:6C:0F:B6:31.

Next, at block 230, the first device 110 transmits an address conflict detection request for the dummy MAC address 00:01:6C:0F:B6:31 to the second device 120. The first device 110 may then receive an address conflict detection response from the second device 120, and the address conflict detection response may indicate whether there is a conflict for the dummy MAC address of the first device 110.

At block 240, the first device 110 may determine whether there is a conflict for the dummy MAC address 00:01:6C:0F:B6:31 based on the address conflict detection response.

If the address conflict detection response indicates that there is no conflict for the dummy MAC address, then at block 250, the first device 110 may establish a connection with the WLAN 100.

If the address conflict detection response indicates that there is a conflict for the dummy MAC address, the first device 110 generates another dummy MAC address that is different from both the real MAC address and the dummy MAC address 00:01:6C:0F:B6:31, for example, 00:05:6D:0G:B8:55. The first device 110 then transmits another address conflict detection request for the other dummy MAC address 00:05:6D:0G:B8:55 to the second device 120, i.e., the step of block 230 is repeated until there is no conflict for the generated dummy MAC, and the generated dummy MAC may be used as the MAC address for accessing the WLAN 100.

In some exemplary embodiments, the first device 110 may transmit the address conflict detection request via a dynamic host configuration protocol discovery (DHCP Discovery) message, and receive the address conflict detection response via a DHCP OFFER message from the second device 120.

In other words, the process of the address conflict detection for the dummy MAC address may be combined with an IP address allocation process based on DHCP.

The DHCP discovery message is used to request the DHCP server that is located at the access device in the local area network for allocating an IP address for accessing the network, and the DHCP offer message is used to transmit the allocated IP address. The DHCP messages have an option field with a variable length. The option field has a "CLV" (code-length-value) structure, and contains initial configuration information and network configuration information of the first device, such as a type of the message, effective lease duration, and an IP address of a domain name system (DNS) server. In an embodiment of the present disclosure, the address conflict detection request may be included in the DHCP discovery message as option information, and the address conflict detection response may be included in the DHCP offer message as option information.

As an example, a code reserved for a dedicated range from 224 to 254 may be used as an option of the address conflict detection, the option has a first value (for example, 0) indicating that there is an address conflict and a second value (for example, 1) indicating that there is no address conflict. The length of the first value or the second value may be 1. Table 1 below shows an exemplary CLU structure of the address conflict detection option.

TABLE 1

| Address conflict detection options | | |
|---|---|---|
| Code | Length | Value |
| 224-254 | 1 | 0/1 |

In the example structure of the address conflict detection option as shown in Table 1, the code may be set to any value selected from the range from 224 to 254, the first value is 0, and the second value is 1, as described above.

In response to the address conflict detection request in the DHCP discovery message, the second device 120 performs the address conflict detection for the dummy MAC address of the first device 110. Based on the result of the address conflict detection, the second device 120 may then include a respective address conflict detection response in the DHCP offer message, and transmit it to the first device 110. The exemplary embodiments with respect to this aspect will be discussed in details below.

In some exemplary embodiments, in response to the address conflict detection response indicating that there is no conflict for the dummy MAC address, the first device 110 may obtain, from the DHCP offer message, an IP address for the first device 110 allocated by the second device 120.

In some exemplary embodiments, the first device 110 may then perform IP address conflict detection on the allocated IP address to determine whether there is a conflict for the IP address. In accordance with a determination that there is no conflict for the IP address, the first device 110 may use the IP address to establish a connection with the WLAN 100. This will be described in detail below with respect to FIG. 4.

According to embodiments of the present disclosure, a method for detecting a MAC address conflict based on the DHCP protocol is proposed. In the method, the conflict detection for the MAC address may be implemented between the first device and the second device by setting the option information of the DHCP protocol. In addition, the method may find that there is a MAC address conflict before the second device allocates the IP address for the first device, such that an interaction process based on the DHCP protocol can be terminated in a timely fashion, and an interaction process of accessing the wireless local area network is simplified.

The process of MAC address conflict detection can also be independent of the IP address allocation process based on the DHCP protocol. In such an embodiment, the first device 110 may transmit the DHCP discovery message to the second device 120 before transmitting the address conflict detection request, and receive an IP address allocated by the second device 120 based on the DHCP discovery message. This will be described below in detail with respect to FIG. 5.

In the present embodiment, since no modification or setting is made to the DHCP protocol, the MAC address conflict detection is implemented at the application layer, without making any modification and setting to the first device and the second device (for example, in terms of IEEE 802.11 protocol and DHCP protocol), and thus the MAC address conflict detection can be well applied to a situation where the interaction process based on the DHCP protocol is implemented in the form of hardware.

It should be understood that the processes, for example, the first device requesting the DHCP server of the WLAN through the DHCP protocol for allocating the IP address and configuration parameters, performing conflict detection on the allocated IP address, and binding the IP address and the MAC address are well-known, and details of which will be omitted.

According to an exemplary embodiment of the present disclosure, using a dummy MAC address to access a wireless local area network can prevent the real MAC address of the first device from leakage, thereby protecting privacy information of the user of the first device. The address conflict detection performed for the dummy MAC address can effectively avoid an address conflict with other first device(s) that has access to the wireless local area network.

Figure 3:
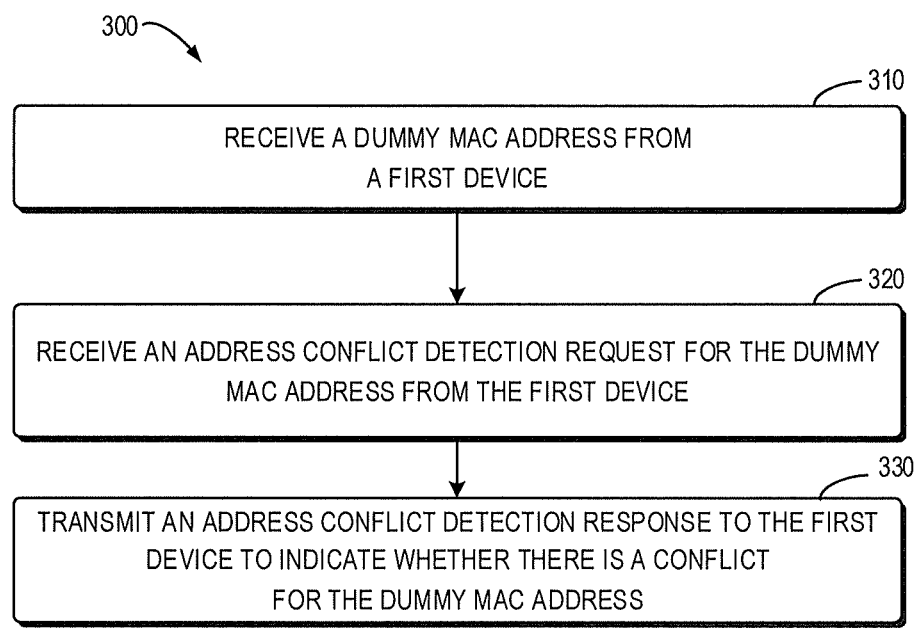
FIG. 3 shows a flowchart of a method for MAC address conflict detection according to some exemplary embodiments of the present disclosure.

FIG. 3 shows a flowchart of a method for the MAC address conflict detection according to some exemplary embodiments of the present disclosure. The method 300 may be implemented at the second device 120 as shown in FIG. 1, or may be implemented by using any suitable device. For ease of discussion, the method 300 will be described below with reference to FIG. 1.

As shown in FIG. 3, at block 310, the second device 120 receives a dummy MAC address (for example, 00:01:6C:0F:B6:31) from the first device 110.

Then, at block 320, the second device 120 receives an address conflict detection request for the dummy MAC address 00:01:6C:0F:B6:31 from the first device 110.

In some exemplary embodiments, based on the address conflict detection request from the first device 110 and the dummy MAC address, the second device 120 may determine whether there is a conflict for the dummy MAC address.

In some exemplary embodiments, the second device 120 compares the dummy MAC address with a set of MAC addresses stored thereon. By way of example, the binding database may be used to store configuration information (such as a MAC address, an IP address, lease duration, VLAN number, etc.) associated with the first device currently connected to the WLAN 100, where the set of MAC addresses includes MAC addresses of all the first devices that currently connect to the WLAN 100. Table 2 below shows example configuration information stored in the binding database.

TABLE 2

Example configuration information in the binding database

| MAC address | IP address | Lease duration (seconds) | VLAN number |
| --- | --- | --- | --- |
| 00:01:6C:0F:B6:31 | 192.168.0.1 | 49810 | 512 |
| 02:07:8C:0A:G6:23 | 192.168.0.2 | 36000 | 1536 |
| 08:00:20:0A:8C:6D | 192.168.0.3 | 49810 | 1021 |
| ... | ... | ... | ... |

As shown in Table 2, in response to the address conflict detection request for the dummy MAC address 00:01:6C:0F:B6:31, the second device 120 queries the example configuration information stored in the binding database, so as to compare the MAC address 00:01:6C:0F:B6:31 with the MAC addresses of other first devices (e.g., first devices 130 and 140) that have accessed and established a connection with the WLAN 100. As can be seen from the example in Table 2, there is another first device configured with the same MAC address in the WLAN 100. In a case where the dummy MAC address 00:01:6C:0F:B6:31 matches one of the MAC addresses in the MAC addresses, the second device 120 may generate an address conflict detection response indicating that there is a conflict for the dummy MAC address. In contrast, in a case where the dummy MAC address 00:01:6C:0F:B6:31 does not match all of the MAC addresses in the set of the MAC addresses, the second device 120 may generate an address conflict detection response indicating that there is no conflict for the dummy MAC address.

Then, at block 330, the second device 120 transmits an address conflict detection response to the first device 110 to indicate a respective result of the dummy MAC address conflict detection, that is, whether there is a conflict for the dummy MAC address.

In some exemplary embodiments, the second device 120 may receive an address conflict detection request via a DHCP discovery message and transmit an address conflict detection response via a DHCP offer message.

As described above, the process of the address conflict detection for the dummy MAC address can be combined with the IP address allocation process based on the DHCP. In the example of Table 2, in accordance with a determination that the dummy MAC address 00:01:6C:0F:B6:31 matches with one of the MAC address in the set of the MAC addresses, the second device 120 or its DHCP server (not shown) may add an option corresponding to the address conflict detection to the option field of the DHCP offer message, and set the value of the option to the first value "0", indicating that there is a conflict for the dummy MAC address 00:01:6C:0F:B6:31.

In another exemplary embodiment, in accordance with a determination that the dummy MAC address does not match all of MAC addresses in the set of the MAC addresses, the second device 120 or its DHCP server may set a value of an option corresponding to the address conflict detection to the second value "1", indicating that there is no conflict for the dummy MAC address. In this case, the second device 120 or its DHCP server may allocate an IP address for the first device, and then transmit the address conflict detection response and the IP address to the first device 110 via the DHCP offer message.

In addition, the process of the MAC address conflict detection may be independent of the IP address allocation process based on the DHCP protocol. In such an embodiment, before transmitting the address conflict detection response, the second device 120 allocates an unused IP address and transmits the IP address to the first device 110 via the DHCP offer message.

It should be understood that the DHCP server and/or the binding database may be local to the second device, or may be a remote device accessible by the second device. The scope of the present disclosure is not limited in this regard.

According to exemplary embodiments of the present disclosure, during a process of the first device accessing the wireless local area network and subsequently establishing a connection with the wireless local area network, the dummy MAC address is used all the time to replace the real MAC address of the first device. In this way, the real MAC address of the first device cannot be obtained from the side of the wireless local area network and the second device, thereby preventing the real MAC address from being tracked and protecting privacy information of the user. Moreover, the address conflict detection performed for the dummy MAC address can effectively avoid address conflicts with other first devices that have accessed the wireless local area network.

Figure 4:
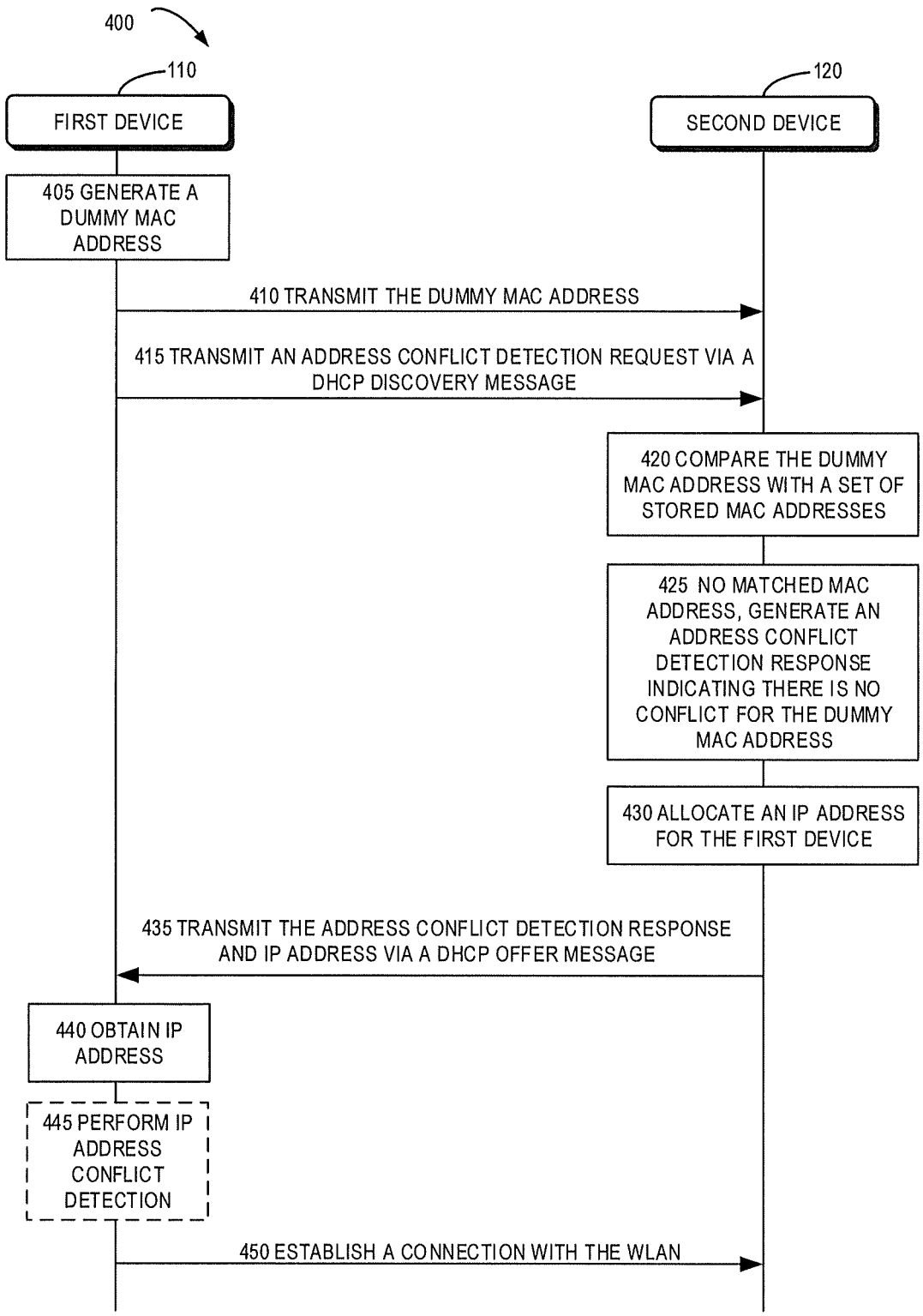
FIG. 4 shows a signaling chart illustrating a process for MAC address conflict detection according to some exemplary embodiments of the present disclosure.

FIG. 4 shows a signaling chart illustrating a process 400 for MAC address conflict detection according to some exemplary embodiments of the present disclosure. The process 400 may be implemented in the example wireless local area network WLAN 100. It should be understood that the signaling process depicted in FIG. 4 is only a specific example of embodiments of the present disclosure, and the scope of the present disclosure is not limited to the described specific details.

As shown in FIG. 4, at step 405, a first device 110 generates a dummy MAC address. By way of example, the first device 110 may be configured with a function of generating the dummy MAC address (Phantom_MAC_address_enabler) to generate the dummy MAC address. At step 410, the first device 110 transmits its dummy MAC address to a second device 120 of the WLAN 100. Then, when the first device wants to connect to the WLAN 100 or in response to data to be transmitted, at step 415, the first device 110 may transmit an address conflict detection request for the dummy MAC address via a DHCP discovery message. At step 420, the second device 120 compares the dummy MAC address with a set of MAC addresses stored thereon. In a case where the dummy MAC address matches with one of the MAC addresses in the MAC addresses, the second device 120 generates an address conflict detection response indicating that there is a conflict for the dummy MAC address, and transmits the address conflict detection response to the first device 110 via a DHCP offer message. In a case where the dummy MAC address does not match with all of the MAC addresses in the set of the MAC addresses, at step 425, the second device 120 generates an address conflict detection response indicating that there is no conflict for the dummy MAC address. Then, at step 430, the second device 120 allocates an IP address for the first device 110. Consequently, at step 435, the second device 120 transmits the address conflict detection response and the allocated IP address to the first device 110 via the DHCP offer message. At step 440, the first device 110 obtains the allocated IP address from the DHCP offer message. Optionally, at step 445, the first device 110 may further perform an IP address conflict detection to determine whether there is a conflict for the allocated IP address. If it is determined that there is no conflict for the IP address, the first device 110 may establish a connection with the WLAN 100.

It should also be understood that the process 400 shown in FIG. 4 is also applicable to a case where Bluetooth is used as a wireless communication technology to access the Internet. In this case, during a process of the first device 110 accessing the WLAN 100 and subsequently establishing a connection with the WLAN 100, a dummy Bluetooth MAC address will be used to replace a real Bluetooth MAC address of the first device, and the second device 120 will perform the address conflict detection for the dummy Bluetooth MAC address. In such an embodiment, the process between the first device 110 and the second device 120 is similar to the process 400, and thus will not be repeated here.

While various steps in the process 400 described above are depicted in a particular order, it should be understood that the order as shown is for illustrative purposes only and not limiting. Unless explicitly stated otherwise, it should not be construed that the process is required to be performed in the particular order as shown or in sequential order. In certain circumstances, multitasking and parallel processing may be advantageous. As an example, one or more operations or steps in the process 400 may be performed in a different order, for example, steps 410 and 415 may occur simultaneously, and the like. It should also be understood that the process 400 may also include additional steps not shown and/or one or more steps as shown may be omitted. For example, the first device 110 and the second device 120 may interact through a DHCP request (DHCP REQUEST) message, a DHCP acknowledgment (DHCP ACK) message, a DHCP decline (DHCP DECLINE) message to complete the IP address allocation process based on DHCP, etc.

Figure 5:
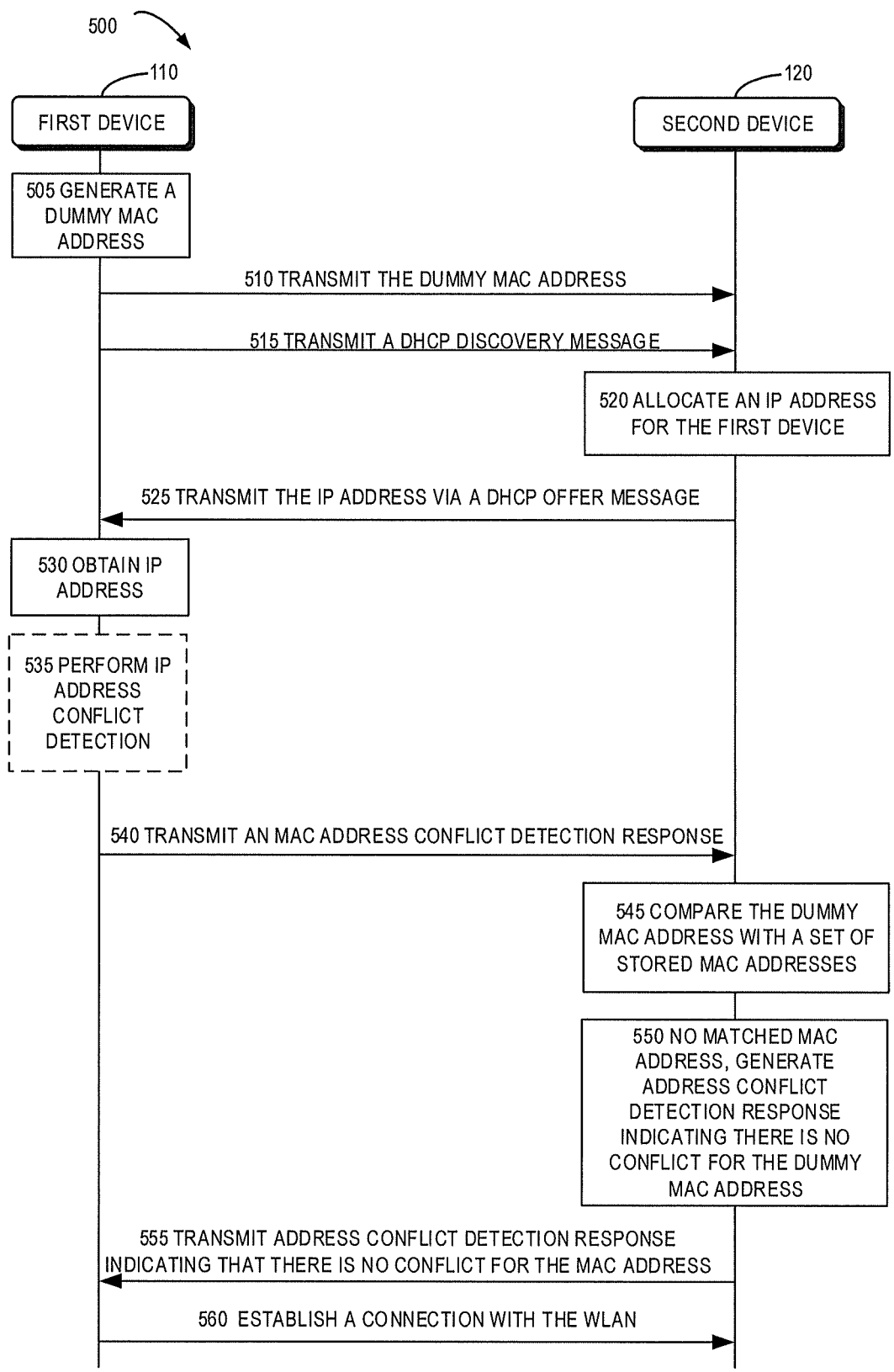
FIG. 5 shows another signaling chart illustrating a process for MAC address conflict detection according to some exemplary embodiments of the present disclosure.

FIG. 5 shows another signaling chart illustrating a process 500 for MAC address conflict detection according to some exemplary embodiments of the present disclosure. The process 500 may be implemented in the example wireless local area network WLAN 100. It should be understood that the process depicted in FIG. 5 is only a specific example of embodiments of the present disclosure, and the scope of the present disclosure is not limited to the described specific details.

As shown in FIG. 5, at step 505, a first device 110 generates a dummy MAC address. At step 510, the first device 110 transmits its dummy MAC address to a second device 120 of the WLAN 100. Steps 505 and 510 are similar to steps 405 and 410 as described above with respect to FIG. 4. Then, when the first device wants to connect to the WLAN 100 or the first device has data to be transmitted and thus there is a demand to establish a network connection, at step 515, the first device 110 transmits a DHCP discovery message to the second device 120. After receiving the DHCP discovery message, at step 520, the second device 120 allocates an address for the first device 110. Next, at step 525, the second device 120 transmits an IP address to the first device 110 via a DHCP offer message. At step 530, the first device 110 obtains the allocated IP address from the DHCP offer message. Optionally, at step 535, the first device 110 may further perform an IP address conflict detection to determine whether there is a conflict for the allocated IP address. At step 540, the first device 110 transmits an address conflict detection request for the dummy MAC address to the second device 120. After receiving the address conflict detection request, at step 545, the second device 120 compares the dummy MAC address with a set of MAC addresses stored thereon. In a case where the dummy MAC address matches with one of the MAC addresses in the set of the MAC addresses, the second device 120 transmits an address conflict detection response indicating that there is a conflict for the dummy MAC to the first device 110. Optionally, in a case where there is a conflict for the dummy MAC address, the first device 110 may further transmit a DHCP release (DHCP RELEASE) message to the second device 120 to indicate that the first device 110 does not need the allocated IP address any more, causing the second device 120 to recycle the IP address. In a case where the dummy MAC address does not match with all of the MAC addresses in the set of the MAC addresses, at step 550, the second device 120 generates an address conflict detection response indicating that there is no conflict for the dummy MAC address. At step 555, the second device 120 then transmits an address conflict detection response indicating that there is no conflict for the dummy MAC address to the first device 110. At step 560, the first device 110 establishes a connection with the WLAN 100.

It should also be understood that the process 500 shown in FIG. 5 is also applicable to a case where Bluetooth is used as a wireless communication technology to access the Internet. In this case, during a process of the first device 110 accessing the WLAN 100 and subsequently establishing a connection with the WLAN 100, a dummy Bluetooth MAC address will be used to replace a real Bluetooth MAC address of the first device, and the second device 120 will perform the address conflict detection for the dummy Bluetooth MAC address. In such an embodiment, the process between the first device 110 and the second device 120 is similar to the process 500, and thus will not be repeated here.

While various steps in the process 500 described above are depicted in a particular order, it should be understood that the order as shown is for illustrative purposes only and not for limiting. Unless explicitly stated otherwise, it should not be construed that the process is required to be performed in the particular order as shown or in sequential order. In certain circumstances, multitasking and parallel processing may be advantageous. As an example, one or more operations or steps in the process 500 may be performed in a different order, for example, steps 510 and 515 may occur simultaneously, and the like. It should also be understood that the process 500 may also include additional steps not shown and/or one or more steps shown may be omitted. For example, the first device 110 and the second device 120 may interact through a DHCP request (DHCP REQUEST) message, a DHCP acknowledgment (DHCP ACK) message, a DHCP decline (DHCP DECLINE) message to complete the IP address allocation process based on DHCP, etc.

Figure 6:
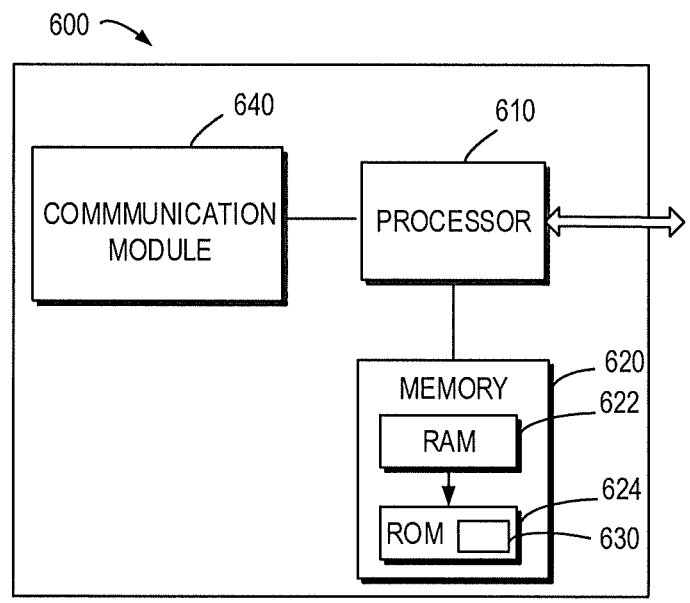
FIG. 6 shows a block diagram of a device that is suitable for implementing the embodiments of the present disclosure.

FIG. 6 shows a block diagram of a device 600 that is suitable for implementing exemplary embodiments of the present disclosure. The device 600 may be implemented at the first device 110, at the second device 120 shown in FIG. 1, or at a part thereof. As shown in FIG. 6, the device 600 includes at least one processor 610, at least one memory 620 coupled to the processor 610, a communication module 640 coupled to the processor 610, and a communication interface (not shown) coupled to the communication module 640. The memory 620 stores at least a computer program 630.

The communication module 640 is used for two-way communication. The communication module 640 has at least one antenna for facilitating communication. The communication interface may represent any interface necessary for communication.

The processor 610 causes, by executing instructions, the device 600 to perform related operations and features of the first device 110 and the second device 120 described above with reference to FIGS. 1 to 5. As an example, a function of generating the dummy MAC address (for example, Phantom_MAC_address_enabler) may be performed on the first device 110 by executing an instruction. As another example, a function of dummy MAC address conflict detection (e.g., Phantom_MAC_conflict_detection) can be performed on the second device 120 by executing an instruction. All the features described above with reference to FIGS. 1 to 5 are applicable to the device 600, and descriptions thereof are omitted here.

The processor 610 may be of any type suitable to the local technical environment, and may include one or more of the following: general-purpose computers, special-purpose computers, microprocessors, digital signal controllers (DSPs), and processors based on multicore processor architecture. The device 600 may include multiple processors, such as an application specific integrated circuit chip that is slaved in time to a clock which synchronizes the main processor.

The memory 620 may include one or more non-volatile memories and one or more volatile memories. Examples of non-volatile memory include, but are not limited to, a Read Only memory (ROM) 624, an electrically programmable ROM (EPROM), a flash memory, a hard disk, a compact disk (CD), a digital video disk (DVD), and other magnetic storage and/or optical storage devices. Examples of the volatile memories include, but are not limited to, a random access memory (RAM) 622 and other volatile memories that will not last in the power-down duration.

A computer program 630 includes computer-executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630, so that the device 600 may perform any process of the disclosure as discussed with reference to FIG. 1-5. The exemplary embodiments of the present disclosure may also be implemented by hardware or by a combination of software and hardware.

Figure 7:
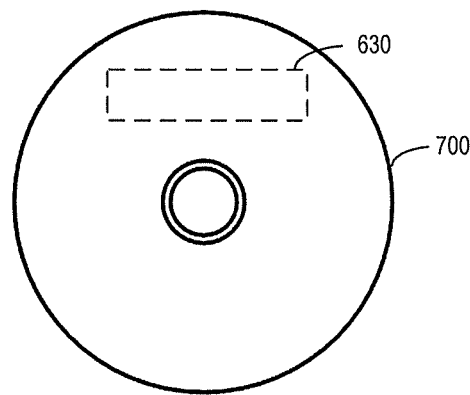
FIG. 7 shows a block diagram of an exemplary computer readable medium according to some exemplary embodiments of the present disclosure.

In some exemplary embodiments, the program 630 may be tangibly contained in a computer readable medium, which may be included in the device 600 (such as in the memory 620) or other storage devices that are accessible by the device 600. The device 600 may load the program 630 from the computer readable medium to the RAM 622 for execution. The computer readable medium may include any type of tangible non-volatile storage, such as a ROM, an EPROM, a flash memory, a hard disk, a CD, a DVD, and the like. FIG. 7 shows an example of the computer readable medium 700 in the form of a CD or DVD. The computer readable medium has the program 630 stored thereon.

Generally, various exemplary embodiments of the present disclosure may be implemented in hardware or special purpose circuits, software, logic, or any combination thereof. Some aspects may be implemented in hardware, while other aspects may be implemented in firmware or software that may be executed by a controller, microprocessor, or other computing device. While various aspects of embodiments of the present disclosure are illustrated and described as block diagrams, flowcharts, or using some other pictorial representations, it is to be understood that the blocks, devices, systems, techniques, or methods described herein may be implemented in, as non-limiting examples, hardware, software, firmware, special-purpose circuits or logic, general purpose hardware or a controller or other computing devices, or some combination thereof.

The present disclosure also provides at least one computer program product tangibly stored on a non-transitory computer readable storage medium. The computer program product includes computer executable instructions, such as those included in program modules, which are executed in a device on a target real or virtual processor to implement the method as described above with reference to FIG. 1-5. Generally speaking, the program modules include a routine, a program, a library, an object, a class, a component, a data structure, etc., which perform a particular task or implement a particular abstract data structure. In various exemplary embodiments, functions of the program modules may be merged or divided between the described program modules. Machine-executable instructions for program modules can be executed locally or in distributed devices. In distributed devices, the program modules may be located in both a local storage medium and a remote storage medium.

Computer program codes for implementing the method of the present disclosure may be written in one or more programming languages. These computer program codes may be provided to a processor of a general-purpose computer, a special-purpose computer, or other programmable data processing apparatus, so that the program codes, when executed by the computer or other programmable data processing apparatus, cause the functions/operations specified in the flowchart and/or block diagram to be implemented. The program codes may execute entirely on a computer, partly on a computer, as an independent software package, partly on a computer and partly on a remote computer, or entirely on a remote computer or server.

In the context of the present disclosure, the computer program codes or related data may be carried by any suitable carrier to cause a device, an apparatus, or a processor to perform various processes and operations as described above. Examples of carriers include a signal, a computer-readable medium, and the like.

Examples of the signal may include an electrical signal, an optical signal, radio, sound, or propagated signals in other forms, such as a carrier wave, an infrared signal, and the like.

The computer-readable medium may be a computer-readable signal medium or a computer-readable storage medium. The computer-readable medium may include, but is not limited to, electronic, magnetic, optical, electromagnetic, infrared, or semiconductor systems, apparatuses or devices, or any suitable combination thereof. More detailed examples of the computer-readable storage medium include an electrical connection with one or multiple wires, a portable computer magnetic disk, a hard disk, a random access memory (RAM), a read-only memory (ROM), an erasable programmable ROM (EPROM or flash memory), an optical fiber, a portable compact disk ROM (CD-ROM), an optical storage device, a magnetic storage device, or any suitable combination thereof.

In addition, although the operations are depicted in a particular order, this should not be construed as that such operations are required to be performed in the particular order as shown or in sequential order, or that all illustrated operations are required to be performed to achieve desirable results. In certain circumstances, multitasking and parallel processing may be advantageous. Likewise, while several specific implementation details are contained in the above discussions, these should not be construed as limitations on the scope of any inventions or claims, but rather as descriptions of particular embodiments for a specific invention. Certain features of the specification that are described in the context of separate embodiments may also be implemented in combination in a single embodiment. Conversely, various features that are described in the context of a single embodiment may also be implemented in multiple embodiments separately or in any suitable sub-combinations.

Although the present disclosure has been described in language specific to structural features and/or methodological acts, it is to be understood that the present disclosure defined in the appended claims is not necessarily limited to the specific features or acts described above. Rather, the specific features and acts described above are disclosed in exemplary form for implementing the claims.

Various exemplary embodiments of the technology have been described. As an alternative or supplement to the above, the following examples are described. The features described in any of the following examples can be used with any of the other examples described herein.

Example 1

A first device, including: at least one processor; and at least one memory including computer program codes. The at least one memory and the computer program codes are configured to, with at least one processor, cause the first device to: in response to detecting a wireless local area network, transmit a dummy MAC address of the first device to a second device in the wireless local area network, the dummy MAC address being different from a real MAC address of the first device; transmit an address conflict detection request for the dummy MAC address to the second device; and in response to the address conflict detection response from the second device indicating that there is no conflict for the dummy MAC address, establish a connection with the wireless local area network.

Example 2

The first device of Example 1, wherein the first device is further caused to: in response to the address conflict detection response indicating that there is a conflict for the dummy MAC address, generate another dummy MAC address different from the real MAC address and the dummy MAC address of the first device; and transmit an address conflict detection request for the other dummy MAC address to the second device.

Example 3

The first device of Example 1, wherein the first device is caused to transmit the address conflict detection request by: transmitting the address conflict detection request via a dynamic host configuration protocol, DHCP, discovery message, and the first device is further caused to: receive the address conflict detection response via a DHCP offer message.

Example 4

The first device of Example 3, wherein the first device is caused to establish the connection with the wireless local area network by: obtaining, from the DHCP offer message, an IP address for the first device allocated by the second device.

Example 5

The first device of Example 1, wherein the first device is further caused to: transmit a DHCP discovery message to the second device before transmitting the address conflict detection request; and receive an IP address for the first device allocated by the second device based on the DHCP discovery message.

Example 6

The first device of Example 4 or 5, wherein the first device is caused to establish the connection with the wireless local area network by: determining whether there is a conflict for the allocated IP address; and in response to determining that there is no conflict for the IP address, establishing the connection with the IP address.

Example 7

The first device of Example 1, wherein the first device is further caused to: generate the dummy MAC address, the dummy MAC address including at least one of: a MAC address randomly generated; and a MAC address selected from a set of pre-configured MAC addresses.

Example 8

The first device of Example 1, wherein the first device is a terminal device, and the second device is an access device in the wireless local area network.

Example 9

A second device including: at least one processor; and at least one memory including computer program codes, the at least one memory and the computer program codes are configured to, with the at least one processor, cause the second device to: receive a dummy MAC address from the first device, the dummy MAC address being different from a real MAC address of the first device; receive an address conflict detection request for the dummy MAC address from the first device; and transmit an address conflict detection response to the first device to indicate whether there is a conflict for the dummy MAC address.

Example 10

The second device of Example 9, wherein the second device is further caused to: compare the dummy MAC address with a set of MAC addresses stored at the second device; in accordance with a determination that the dummy MAC address does not match all of the MAC addresses in the set of the MAC addresses, generate the address conflict detection response indicating that there is no conflict for the dummy MAC address; and in accordance with a determination that the dummy MAC address matches with a MAC address of the set of the MAC addresses, generate the address conflict detection response indicating that there is a conflict for the dummy MAC address.

Example 11

The second device of Example 9, wherein the second device is caused to receive the address conflict detection request by: receiving the address conflict detection request via a dynamic host configuration protocol, DHCP, discovery message; and wherein the second device is caused to transmit the address conflict detection response includes: end the address conflict detection response via a DHCP offer message.

Example 12

The second device of Example 11, wherein the second device is further caused to: allocate an IP address for the first device; and transmit the address conflict detection response and the IP address via the DHCP offer message.

Example 13

The second device of Example 9, wherein the second device is further caused to: before transmitting the address conflict detection response, allocate an IP address for the first device; and transmit the IP address to the first device via a DHCP offer message.

Example 14

The second device of Example 9, wherein the second device is an access device in the wireless local area network, and the first device is a terminal device.

Example 15

A method of detecting a media access control layer, MAC, address conflict, including: in response to detecting a wireless local area network, transmitting, at a first device, a dummy MAC address of the first device to a second device in the wireless local area network, the dummy MAC address being different from a real MAC address of the first device; transmitting an address conflict detection request for the dummy MAC address to the second device; and in response to an address conflict detection response from the second device indicating that there is no conflict for the dummy MAC address, establishing a connection with wireless LAN.

Example 16

The method of Example 15, further including: in response to the address conflict detection response indicating that there is a conflict for the dummy MAC address, generating another dummy MAC address different from the real MAC address of the first device and the dummy MAC address; and transmitting an address conflict detection request for the other dummy MAC address to the second device.

Example 17

The method of Example 15, wherein transmitting the address conflict detection request includes: transmitting the address conflict detection request via a dynamic host configuration protocol, DHCP, discovery message, and wherein the method further includes: receiving the address conflict detection response via a DHCP offer message.

Example 18

The method of Example 17, where establishing the connection with the wireless local area network includes: obtaining, from the DHCP offer message, an IP address for the first device allocated by the second device.

Example 19

The method of Example 15, further including: transmitting a DHCP discovery message to the second device before transmitting the address conflict detection request; and receiving an IP address for the first device allocated by the second device based on the DHCP discovery message.

Example 20

The method of Example 18 or 19, wherein establishing the connection with the wireless local area network includes: determining whether there is a conflict for the allocated IP address; and in response to determining that there is no conflict for the IP address, establishing the connection with the IP address.

Example 21

The method of Example 15, further including: generating the dummy MAC address including at least one of: a MAC address randomly generated; and a MAC address selected from a set of pre-configured MAC addresses.

Example 22

The method of Example 15, wherein the first device is a terminal device and the second device is an access device in the wireless local area network.

Example 23

A method of detecting a media access control layer, MAC, address conflict, including: receiving, at a second device, a dummy MAC address from a first device, the dummy MAC address being different from a real MAC address of the first device; receiving an address conflict detection request for the dummy MAC address from the first device; and transmitting an address conflict detection response to the first device to indicate whether there is a conflict for the dummy MAC address.

Example 24

The method of Example 23, further including: comparing the dummy MAC address with the set of the MAC addresses stored by the second device; in accordance with a determination that the dummy MAC address does not match with all of MAC addresses in the set of the MAC addresses, generating the address conflict detection response indicating that there is no conflict for the dummy MAC address; and in accordance with a determination that the dummy MAC address matches with a MAC address in the set of the MAC addresses, generating the address conflict detection response indicating that there is a conflict for the dummy MAC address.

Example 25

The method of Example 23, wherein receiving the address conflict detection request includes: receiving the address conflict detection request via a dynamic host configuration protocol, DHCP, discovery message; and where transmitting the address conflict detection response includes: transmitting the address conflict detection response via a DHCP offer message.

Example 26

The method of Example 25, wherein transmitting the address conflict detection response via the DHCP offer message further includes: allocating an IP address for the first device; and transmitting the address conflict detection response and the IP address via the DHCP offer message.

Example 27

The method of Example 23, further including: before transmitting an address conflict detection response, allocating an IP address for the first device; and transmitting the IP address to the first device via a DHCP offer message.

Example 28

The method of Example 23, where the second device is an access device in the wireless local area network, and the first device is a terminal device.

Example 29

An apparatus for detecting a media access control layer, MAC, address conflict, including: transmitting, in response to detecting a wireless local area network, a dummy MAC address of a first device to a second device in the wireless local area network, the dummy MAC address being different from a real MAC address of the first device; means for transmitting an address conflict detection request for the dummy MAC address to the second device; and means for establishing, in response to an address conflict detection response from the second device indicating that there is no conflict for the dummy MAC address, a connection with the wireless local area network.

Example 30

The apparatus of Example 29, further including: means for generating, in response to the address conflict detection response indicating that there is a conflict for the dummy MAC address, generating another dummy MAC address different from the real MAC address of the first device and the dummy MAC address; and means for transmitting an address conflict detection request for the other dummy MAC address to the second device.

Example 31

The apparatus of Example 29, wherein the means for transmitting the address conflict detection request is configured to: transmit the address conflict detection request via a dynamic host configuration protocol, DHCP, discovery message, and the apparatus further includes means for receiving the address conflict detection response via a DHCP offer message.

Example 32

The apparatus of Example 31, wherein the means for establishing the connection with the wireless local area network is configured to: obtain an IP address for the first device allocated by the second device from the DHCP offer message.

Example 33

The apparatus of Example 29, further including: means for transmitting a DHCP discovery message to the second device before transmitting the address conflict detection request; and means for receiving an IP address for the first device allocated by the second device based on the DHCP discovery message.

Example 34

The apparatus of Example 32 or 33, where the means for establishing the connection with the wireless local area network is configured to: determine whether there is a conflict for the allocated IP address; and in response to determining that there is no conflict for the IP address, establish the connection with the IP address.

Example 35

The apparatus of Example 29, further including: means for generating the dummy MAC address, the dummy MAC address including at least one of: a randomly generated MAC address; and a MAC address selected from a set of pre-configured MAC addresses.

Example 36

An apparatus for detecting a media access control layer, MAC, address conflict, including: means for receiving a dummy MAC address from a first device, the dummy MAC address being different from a real MAC address of the first device; means for receiving an address conflict detection request for the dummy MAC address from the first device; and means for transmitting an address conflict detection response to the first device to indicate whether there is a conflict for the dummy MAC address.

Example 37

The apparatus of Example 36, further including: means for comparing the dummy MAC address with a set of MAC addresses stored by the second device; means for generating, in accordance with a determination that the dummy MAC address does not match with all of MAC addresses in the set of the MAC addresses, the address conflict detection response indicating that there is no conflict for the dummy MAC address, and means for generating, in accordance with a determination that the dummy MAC address matches with a MAC address in the set of the MAC addresses, the address conflict detection response indicating that there is a conflict for the dummy MAC address.

Example 38

The apparatus of Example 36, wherein the means for receiving the address conflict detection request is configured to: receive the address conflict detection request via a dynamic host configuration protocol, DHCP, discovery message; and the means for transmitting the address conflict detection response is configured to: transmit the address conflict detection response via a DHCP offer message.

Example 39

The apparatus of Example 38, wherein the means for transmitting the address conflict detection response via the DHCP offer message is further configured to: allocate an IP address for the first device; and transmit the address conflict detection response and the IP address via the DHCP offer message.

Example 40

The apparatus of Example 36, further including: means for allocating an IP address for the first device before transmitting the address conflict detection response; and means for transmitting the IP address to the first device via a DHCP offer message.

Example 41

A computer-readable storage medium having a computer program stored thereon, the computer program including instructions which, when executed by a processor on a device, cause the device to perform any of Examples 15-22.

Example 42

A computer-readable storage medium having a computer program stored thereon, the computer program including instructions which, when executed by a processor on a device, cause the device to perform any of Examples 23-28.

We claim:

1. A first device, comprising:
   at least one processor; and
   at least one non-transitory memory comprising computer program codes,
   the at least one memory and the computer program codes are configured to, with the at least one processor, cause the first device to:
   in response to detecting a wireless local area network, transmit a dummy media access control address of the first device to a second device in the wireless local area network, the dummy media access control address being different from a real media access control address of the first device;
   transmit, via a dynamic host configuration protocol discovery message, an address conflict detection request for the dummy media access control address to the second device;
   receive an address conflict detection response via a dynamic host configuration protocol offer message; and
   in response to an address conflict detection response from the second device indicating that there is no conflict for the dummy media access control address, establish a connection with the wireless local area network.

2. The first device of claim 1, wherein the first device is further caused to:
   in response to the address conflict detection response indicating that there is a conflict for the dummy media access control address, generate another dummy media access control address different from the real media access control address of the first device and the dummy media access control address; and
   transmit an address conflict detection request for the other dummy media access control address to the second device.

3. The first device of claim 1, wherein the first device is caused to establish the connection with the wireless local area network with:
   obtaining, from the dynamic host configuration protocol offer message, an internet protocol address for the first device allocated with the second device.

4. The first device of claim 3, wherein the first device is caused to establish the connection with the wireless local area network with:
   determining whether there is a conflict for the allocated internet protocol address; and
   in response to determining that there is no conflict for the internet protocol address, establishing the connection with the internet protocol address.

5. The first device of claim 1, wherein the first device is further caused to:
   transmit the dynamic host configuration protocol discovery message to the second device before transmitting the address conflict detection request; and
   receive an internet protocol address for the first device allocated with the second device based on the dynamic host configuration protocol discovery message.

6. The first device of claim 1, wherein the first device is further caused to:
   generate the dummy media access control address, the dummy media access control address comprising at least one of:
   a media access control address randomly generated; or
   a media access control address selected from a set of pre-configured media access control addresses.

7. A second device, comprising:
   at least one processor; and
   at least one non-transitory memory comprising computer program codes,
   the at least one memory and the computer program codes are configured to, with the at least one processor, cause the second device to:
   receive a dummy media access control address from a first device, the dummy media access control address being different from a real media access control address of the first device;
   receive, via a dynamic host configuration protocol discovery message, an address conflict detection request for the dummy media access control address from the first device; and
   transmit via a dynamic host configuration protocol offer message an address conflict detection response to the first device to indicate whether there is a conflict for the dummy media access control address.

8. The second device of claim 7, wherein the second device is further caused to:
   compare the dummy media access control address with a set of media access control addresses stored at the second device;
   in accordance with a determination that the dummy media access control address does not match all of the set of the media access control addresses, generate the address conflict detection response indicating that there is no conflict for the dummy media access control address; and
   in accordance with a determination that the dummy media access control address matches one of the media access control addresses in the set of the media access control addresses, generate the address conflict detection response indicating that there is a conflict for the dummy media access control address.

9. The second device of claim 7, wherein the second device is further caused to:
   allocate an internet protocol address for the first device; and
   transmit the internet protocol address via the dynamic host configuration protocol offer message.

10. The second device of claim 7, wherein the second device is further caused to:
    before transmitting the address conflict detection response,
    allocate an internet protocol address for the first device; and transmit the internet protocol address to the first device via a dynamic host configuration protocol offer message.

11. The second device of claim 7, wherein the second device is an access device in the wireless local area network, and the first device is a terminal device.

12. A method comprising:
  detecting a media access control address conflict, comprising:
    in response to detecting a wireless local area network, transmitting, at a first device, a dummy media access control address of the first device to a second device in the wireless local area network, the dummy media access control address being different from a real media access control address of the first device;
    transmitting, via a dynamic host configuration protocol discovery message, an address conflict detection request for the dummy media access control address to the second device;
    receiving an address conflict detection response via a dynamic host configuration protocol offer message; and
    in response to an address conflict detection response from the second device indicating that there is no conflict for the dummy media access control address, establishing a connection with the wireless local area network.

13. The method of claim 12, further comprising:
  in response to the address conflict detection response indicating that there is a conflict for the dummy media access control address, generating another dummy media access control address different from the real media access control address of the first device and the dummy media access control address; and
  transmitting an address conflict detection request for the other dummy media access control address to the second device.

14. The method of claim 12, wherein establishing the connection with the wireless local area network comprises obtaining, from the dynamic host configuration protocol offer message, an internet protocol address for the first device allocated with the second device.

15. The method of claim 14, wherein establishing the connection with the wireless local area network comprises:
  determining whether there is a conflict for the allocated internet protocol address; and
  in response to determining that there is no conflict for the internet protocol address, establishing the connection with the internet protocol address.

16. The method of claim 12, further comprising:
  transmitting a dynamic host configuration protocol discovery message to the second device before transmitting the address conflict detection request; and
  receiving an internet protocol address for the first device allocated with the second device based on the dynamic host configuration protocol discovery message.

17. The method of claim 12, further comprising:
  generating the dummy media access control address, the dummy media access control address comprising at least one of:
    a media access control address randomly generated; or
    a media access control address selected from a set of pre-configured media access control addresses.

18. A computer-readable storage medium having a computer program stored thereon, the computer program comprising instructions which, when executed with a processor on a device, cause the device to perform the method according to claim 12.

19. A method comprising:
  detecting a media access control address conflict, comprising:
    receiving, at a second device, a dummy MAC address from a first device, the dummy media access control address being different from a real media access control address of the first device;
    receiving, via a dynamic host configuration protocol discovery message, an address conflict detection request for the dummy media access control address from the first device; and
    transmitting via a dynamic host configuration protocol offer message an address conflict detection response to the first device to indicate whether there is a conflict for the dummy media access control address.

20. The method of claim 19, further comprising:
  comparing the dummy media access control address with a set of media access control addresses stored at the second device;
  in accordance with a determination that the dummy media access control address does not match all of the set of the media access control addresses, generating the address conflict detection response indicating that there is no conflict for the dummy media access control address; and
  in accordance with a determination that the dummy media access control address matches one of the media access control addresses in the set of the media access control addresses, generating the address conflict detection response indicating that there is a conflict for the dummy media access control address.

21. The method of claim 19, wherein the transmitting of the address conflict detection response via the dynamic host configuration protocol offer message further comprises:
  allocating an internet protocol address for the first device; and
  transmitting the address conflict detection response and the internet protocol address via the dynamic host configuration protocol offer message.

22. The method of claim 19, further comprising:
  before transmitting the address conflict detection response,
  allocating an internet protocol address for the first device; and
  transmitting the internet protocol address to the first device via the dynamic host configuration protocol offer message.

23. A computer-readable storage medium having a computer program stored thereon, the computer program comprising instructions which, when executed with a processor on a device, cause the device to perform the method according to claim 19.

* * * * *